United States Patent [19]

Hayward

[11] Patent Number: 5,161,308
[45] Date of Patent: Nov. 10, 1992

[54] ASBESTOS ABATEMENT KNIFE

[76] Inventor: Donald G. Hayward, 37 Conifer Ct., Avon, Conn. 06001

[21] Appl. No.: 733,991

[22] Filed: Jul. 22, 1991

[51] Int. Cl.$^5$ .............................. B26B 3/00
[52] U.S. Cl. ...................... 30/123.3; 30/123
[58] Field of Search ............ 30/123.3, 123; 51/266, 51/267

[56] References Cited

U.S. PATENT DOCUMENTS

| | | | |
|---|---|---|---|
| 773,743 | 11/1904 | Hoffmann | 30/123.3 |
| 1,672,416 | 6/1928 | La Clair | 30/123.3 |
| 1,828,621 | 10/1931 | Roberts | 30/123.3 |
| 2,276,365 | 3/1942 | Angel | 30/123.3 |
| 2,730,838 | 1/1956 | Wilson | 30/123.3 |
| 3,143,984 | 8/1964 | Morasch | 30/123.3 |
| 4,219,963 | 9/1980 | Mullett | 30/123.3 |
| 4,807,361 | 2/1989 | Raczkowski | 30/123.3 |
| 4,891,882 | 1/1990 | Bloom et al. | 30/123.3 |

FOREIGN PATENT DOCUMENTS 366991  1/1923  Fed. Rep. of Germany ..... 30/123.3

Primary Examiner—Frank T. Yost
Assistant Examiner—Hwei-Siu Payer
Attorney, Agent, or Firm—Robert S. Smith

[57] ABSTRACT

An asbestos abatement tool which an elongated housing including a grip portion dimensioned and configured for gripping by the hand of a user. The elongated housing has a first axial extremity and a second axial extremity. The apparatus also includes a fluid conduit extending through the housing generally from the first axial extremity to the second axial extremity. The conduit includes structure for attaching to an associated fluid source. A blade extends from the second axial extremity of the housing. Structure for engaging the blade cooperates with the housing are also included together with a valve for controlling fluid flow in the conduit and a nozzle cooperating with the fluid conduit dimensioned and configured to direct a mist proximate to the blade.

7 Claims, 1 Drawing Sheet

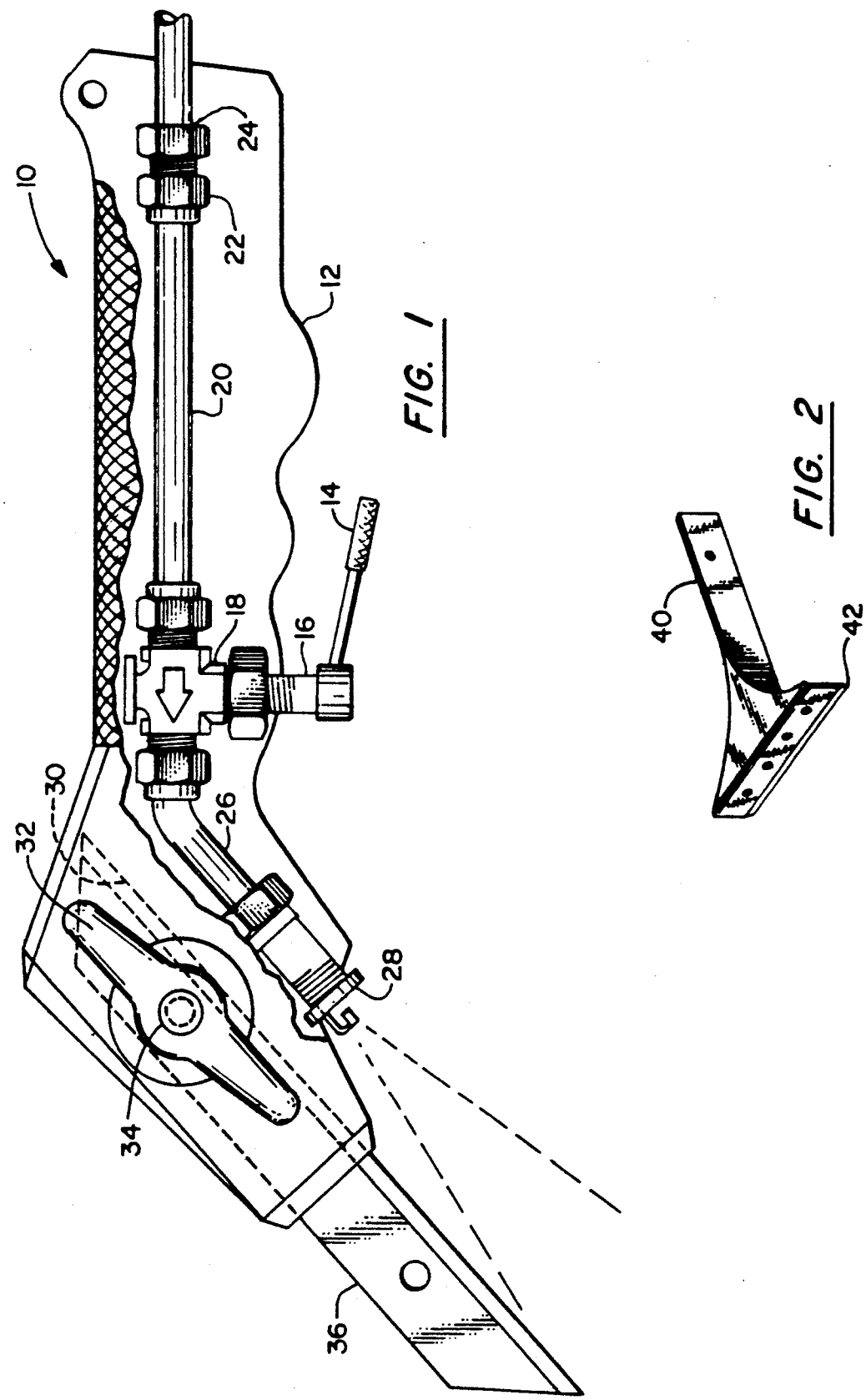

ASBESTOS ABATEMENT KNIFE

BACKGROUND OF THE INVENTION

The invention relates to asbestos abatement tools and particularly to hand tools for cutting away asbestos. Because asbestos was used so extensively in construction the task of removing is substantial whether considered by the individual building, community, state, nation or globally. A major aspect of this high cost is the labor cost for what is a labor intensive task.

It is known to use wet removal techniques such as those described in U.S. Pat. Nos. 4,821,397 and 4,815,488. It has been general practice when cutting asbestos away to have a first worker use a conventional utility knife and for a second worker to direct a fine spray of water over the general area to keep the asbestos fibers from becoming airborne and thus minimize the health dangers. Workers in this field who hold the nozzle and hose are usually paid well. For example, a labor rate of $24.00 would not be uncommon.

It is an object of the invention to provide apparatus that will eliminate the second worker by providing apparatus that a single worker can easily operate.

It is an object of the invention to provide apparatus which is inexpensive to manufacture (compared to the potential savings) as well as easy to use.

Still another object of the invention is to provide apparatus that is at least as safe as the existing discrete knife and hose with a nozzle.

It is yet another object of the present invention to provide apparatus that will pay for itself, because of the reduced labor costs, within three shifts.

SUMMARY OF THE INVENTION

It has now been found that these and other objects of the invention may be attained in an asbestos abatement tool which includes an elongated housing including a grip portion dimensioned and configured for gripping by the hand of a user. The elongated housing has a first axial extremity and a second axial extremity. The apparatus also includes a fluid conduit extending through the housing generally from the first axial extremity to the second axial extremity. The conduit includes means for attaching to an associated fluid source. A blade extends from the second axial extremity of the housing. Means for engaging the blade cooperating with the housing are also included together with valve means for controlling fluid flow in the conduit and a nozzle cooperating with the fluid conduit dimensioned and configured to direct a mist proximate to the blade.

In some forms of the invention the blade is generally planar and the valve is a toggle valve. The means for engaging the blade may include a slot and means for clamping the blade and the means for clamping may include a threaded knob clamping member. The apparatus may have a valve means that includes a pivotally mounted lever.

BRIEF DESCRIPTION OF THE DRAWING

The invention will be better understood by reference to the accompanying drawing in which:

FIG. 1 is a partially schematic side elevational view of a knife in accordance with one form of the invention.

FIG. 2 is a partially schematic perspective view of the scrapper blade that may be substituted for the knife blade shown in FIG. 1.

DESCRIPTION OF THE PREFERRED EMBODIMENT

Referring now to FIGS. 1-2 there is shown a knife apparatus 10 in accordance with one form of the invention. The knife apparatus 10 in accordance with the invention is generally elongated and includes a molded hand grip shaped portion 12. The grip shaped portion 12 is dimensioned and configured for comfortable gripping by a user. Disposed for easy reach on the grip portion 12 is a thumb pressure area for easier cutting or scrapping. Disposed for easy access by the fingers of the user is a lever 14 that in the preferred embodiment is mounted on a shaft 16 which is part of a toggle valve 18. In the preferred form of the invention the lever 14 is gripped by the fingers (not the thumb) and squeezed to open the valve. The preferred form of the invention includes spring bias of the valve to the closed position.

In some forms of the invention the valve 18 may be push button operated and depression of the push button (not shown) will open the valve 18 to release a fog spray of liquid. In some forms of the invention the valve 18 may be a ball valve. In the ball valve forms of the invention the rotation of the shaft 16 through an arc of between 90 degrees and 180 degrees will open the valve. Movement of the lever 14 or pushbutton to the original position will close the valve. It will be understood that in various forms of the invention other valve and valve actuation means may be utilized. These may also include a spring return may be utilized even with the toggle valve 18. For example, in other forms of the invention the valve may be a spring loaded poppet that is lifted off a seat by a trigger that pivots about a pivot point. The same kind of trigger in other forms of the invention will lift a cylinder having a hole in it to a position in which it is aligned with a fluid conduit. This form of the invention may also be spring biased to an off position in which the hole is not aligned with the fluid passageway.

In the illustrated embodiment a polyvinyl chloride (PVC) tube 20 connects the toggle valve 18 to a quick disconnect 22 which is coupled to a female connector 24 which is dimensioned and configured to engage an associated flexible fluid conduit or hose that supplies water. Ordinarily, it is desirable to proved a filter upstream from the associated flexible tube to avoid clogging of the nozzle 28. A 40 micron filter has been found to be particularly satisfactory.

Coupled to the other side of the toggle valve 18 is another PVC tube 26 that has a generally arcuate form. A nozzle 28 is disposed on the other end of the tube 26 to provide a gentle spray and thus minimize asbestos or similar particles from becoming airborne. The nozzle is shown disposed below the blade 36 and this is the preferred form because of the improved user visibility. It will be understood, however, that in other forms of the invention the nozzle 28 may be disposed at a higher elevation. Preferably, the nozzle 28 is of the type referred to in the trade as a fog nozzle. A nozzle size of 0.032 inches has been found to be particularly satisfactory.

The grip shaped portion 12 includes a clamping slot 30 that includes a threaded blade locking knob 32 that by means of a threaded shaft 34 cooperating with the clamping slot 30 locks a blade 36 within the clamping slot 30. It will be understood that the illustrated blade is of the type commonly referred to as a utility knife. In some embodiments of the invention the blade may be shaped more like a scraper blade than the illustrated blade.

In such forms of the invention the same clamp 30 may be used to grip the scraper blade 40. More particularly, the blade 40 in such embodiments may be fabricated by "folding" a single piece of sheet metal or may, for example, be welded together pieces of sheet metal with a stem that engages the clamp 30. Some embodiments may also include a rubber squeegee 42 for use in cleaning windows and other flat surfaces. Those skilled in the art will recognize that the apparatus 10 may be operated by a single worker instead of one worker to cut away the asbestos and another to spray a liquid mist. The savings in labor costs will be so substantial that the apparatus will pay for itself within three shifts of operation. The user need only deflect the lever 14 by squeezing the lever against the grip portion 12 to start the flow of water mist.

It will be understood that while the invention has been described in terms of an asbestos abatement tool that the same apparatus may be used to remove or even install other materials where it is desirable to maintain a curtain of water mist to minimize particles that are airborne or other reasons such as lead abatement.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described my invention I claim:

1. An asbestos abatement apparatus which comprises:
   an elongated housing including a grip portion dimensioned and configured for gripping by the hand of a user, said elongated housing having a first axial extremity and a second axial extremity;
   a fluid conduit extending through said housing generally from said first axial extremity to said second axial extremity;
   said conduit including means for attaching to an associated fluid source;
   a blade extending from said second axial extremity of said housing, said blade being generally planar with first and second planar faces, and having first and second opposed edges;
   means for engaging said blade cooperating with said housing;
   valve means for controlling fluid flow in said conduit; and
   a nozzle cooperating with said fluid conduit dimensioned and configured to direct a mist proximate to said blade, said nozzle being disposed proximate to one of said first and second edges and remote from said generally planar faces.

2. The apparatus as described in claim 1 wherein:
   said first and second edges are elongated.

3. The apparatus as described in claim 2 wherein:
   said nozzle is disposed intermediate one of said first and second edges and an associated workpiece during normal use of said apparatus.

4. The apparatus as described in claim 3 wherein:
   said valve means includes a toggle valve.

5. The apparatus as described in claim 4 wherein:
   said means for engaging said blade includes a clamping slot and means for clamping said blade.

6. The apparatus as described in claim 5 wherein:
   said means for clamping includes a threaded clamping member.

7. The apparatus as described in claim 6 wherein:
   said valve means includes a pivotally mounted lever.

* * * * *